United States Patent
Xu et al.

(10) Patent No.: US 12,321,231 B2
(45) Date of Patent: Jun. 3, 2025

(54) WEIGHTED NON-VOLATILE STORAGE MEDIA SCANS

(71) Applicants: Lemon Inc., Grand Cayman (KY); Beijing Volcano Engine Technology Co., Ltd., Beijing (CN)

(72) Inventors: Peng Xu, Los Angeles, CA (US); Fei Liu, Los Angeles, CA (US); Kyoungryun Bae, Los Angeles, CA (US); Jinhyuk Kim, Los Angeles, CA (US); Hyungjin Im, Los Angeles, CA (US); Kyung Ho Kim, Los Angeles, CA (US); Prathamesh Amritkar, Los Angeles, CA (US); Chaohong Hu, Los Angeles, CA (US); Ken Hu, Los Angeles, CA (US)

(73) Assignees: Beijing Volcano Engine Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/449,213

(22) Filed: Aug. 14, 2023

(65) Prior Publication Data

US 2023/0401124 A1    Dec. 14, 2023

(51) Int. Cl.
*G06F 11/10* (2006.01)
*G06F 11/07* (2006.01)
*G06F 11/30* (2006.01)

(52) U.S. Cl.
CPC ........ *G06F 11/1068* (2013.01); *G06F 11/076* (2013.01); *G06F 11/0793* (2013.01); *G06F 11/3058* (2013.01)

(58) Field of Classification Search
None
See application file for complete search history.

(56) References Cited

U.S. PATENT DOCUMENTS

| | | | |
|---|---|---|---|
| 9,026,869 B1* | 5/2015 | Li | G06F 11/1016 714/718 |
| 2010/0153680 A1* | 6/2010 | Baum | G11B 5/5565 711/E12.002 |

(Continued)

OTHER PUBLICATIONS

H. Park, J. Kim, J. Choi, D. Lee and S. H. Noh, "Incremental redundancy to reduce data retention errors in flash-based SSDs," 2015 31st Symposium on Mass Storage Systems and Technologies (MSST), Santa Clara, CA, USA, 2015, pp. 1-13, (Year: 2015).*

*Primary Examiner* — Daniel F. McMahon
(74) *Attorney, Agent, or Firm* — Fish & Richardson P.C.

(57) ABSTRACT

This disclosure describes a non-volatile storage device includes a non-volatile storage and a controller. The controller includes a data evaluator to evaluate each block of data stored in the non-volatile storage, the evaluation being made in accordance with multiple integrity factors; a factor evaluator to provide a weight to each of the multiple integrity factors for each of the multiple blocks of data, aggregate the multiple weighted integrity factors for each of the multiple blocks of data, and identify one of the multiple blocks of data stored in the non-volatile storage for which the aggregated weight integrity factors is highest; and a scanner to perform at least one media scan of the identified block of data stored in the non-volatile storage, e.g., NAND flash memory.

19 Claims, 3 Drawing Sheets

(56) References Cited

U.S. PATENT DOCUMENTS

| | | | |
|---|---|---|---|
| 2012/0030506 A1* | 2/2012 | Post | G06F 11/008 |
| | | | 714/6.1 |
| 2016/0026410 A1* | 1/2016 | Avila | G06F 3/0619 |
| | | | 711/103 |
| 2016/0110249 A1* | 4/2016 | Orme | G06F 11/1048 |
| | | | 714/6.24 |
| 2019/0050346 A1* | 2/2019 | Greenfield | G06F 12/124 |
| 2019/0114275 A1* | 4/2019 | Dropps | G06F 12/0813 |
| 2020/0327953 A1* | 10/2020 | Fleming | G11C 29/38 |
| 2021/0334032 A1* | 10/2021 | Parker | G06F 3/0604 |
| 2022/0129185 A1* | 4/2022 | Boehm | G06F 11/106 |
| 2022/0197505 A1* | 6/2022 | Kannan | G06F 3/061 |
| 2022/0269599 A1* | 8/2022 | Houssameddine | G06F 11/106 |
| 2023/0401124 A1* | 12/2023 | Xu | G06F 11/3058 |
| 2024/0078326 A1* | 3/2024 | Moran | G06F 21/604 |
| 2024/0087630 A1* | 3/2024 | Wu | G11C 11/1673 |

\* cited by examiner

WEIGHTED NON-VOLATILE STORAGE MEDIA SCANS

TECHNICAL FIELD

The embodiments described herein pertain generally to preserving the integrity of data stored on a solid state drive and the operational bandwidth of the device.

BACKGROUND

Media, i.e., data, stored on an NAND storage device or other non-volatile storage device is vulnerable to being corrupted based on one or more known factors. If a media scan reveals corrupted data, an error correction algorithm may be implemented. Error Correction algorithms deployed to correct corrupted bits stored in NAND flash devices include LDPC (Low Density Parity Code), by which corrupted bits are corrected, for code words under a threshold RBER (Raw Bit Error Rate).

SUMMARY

In one example embodiment, a non-volatile storage device includes a non-volatile storage and a controller. The controller includes a data evaluator to evaluate each block of data stored in the non-volatile storage, the evaluation being made in accordance with multiple integrity factors; a factor evaluator to provide a weight to each of the multiple integrity factors for each of the multiple blocks of data, aggregate the multiple weighted integrity factors for each of the multiple blocks of data, and identify one of the multiple blocks of data stored in the non-volatile storage for which the aggregated weight integrity factors is highest; and a scanner to perform at least one media scan of the identified block of data stored in the non-volatile storage, e.g., NAND flash memory.

In accordance with at least one other example embodiment, a method to preserve operating bandwidth for a non-volatile storage includes evaluating each block of data stored in the non-volatile storage in accordance with multiple integrity factors, providing a weight to each of the multiple integrity factors for each block of data, aggregating the weighted integrity factors for each block of data, performing a media scan for the block of data stored in the non-volatile storage for which the aggregated weight integrity factors is highest, and performing a media scan for the remaining block of data stored in the non-volatile storage.

BRIEF DESCRIPTION OF THE DRAWINGS

In the detailed description that follows, embodiments of a non-volatile storage and operations for facilitating a weighted memory scan therefore are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of a successive drawing may reference features from any previous drawing to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of firmware, software, and/or hardware components configured to perform the specified functions.

The storage density of non-volatile storage, including but not limited to NAND flash devices, continues to grow from SLC (single bit per cell) to MLC (2 bits per cell), to TLC (3 bits per cell), to QLC (4 bits per cell), and beyond. Further, because NAND flash uses voltage levels as being representative of bits in a cell, the increase in bits per cell reduces a margin for voltage distribution per cell.

Raw bit error rate (RBER) for such storage devices may be checked and/or monitored with a background media scan, by which embedded device software and/or firmware periodically reads all physical blocks of the non-volatile storage device that stores valid data thereon. In the interest of efficiency, instead of reading all pages, i.e., word-lines, of a block, word-lines that are deemed to be representative of the quality of a group of word-lines may be scanned. However, as capacity increases for a solid-state storage device, i.e., SSD, including non-volatile storage device that include but are not limited to NAND Flash devices, so does the frequency of media scans required to effectively monitor all word-lines within a limited safe-time window. As a result, performance is adversely affected when excessive performance bandwidth is dedicated to quality assurance.

In accordance with the non-limiting example embodiments of weighted non-volatile storage media scans described and recited herein, bandwidth is allocated during runtime to scan data stored on the storage device to enhance media scan efficiency and, consequently, performance bandwidth allocation.

In the present description and recitation, the following terms may provide context for embodiments described, recited, and/or suggested herein; and may also be used, in addition to their accepted meaning, as follows.

Media scan may refer to a partial or comprehensive reading of data stored on the non-volatile storage, e.g., Flash device. A media scan may be implemented, facilitated, or executed by firmware corresponding to the storage device.

A dimension, as referenced herein, may refer to an integrity factor that, when a corresponding milestone or threshold value thereof is met or surpassed, has the potential to adversely affect the integrity of data stored in the non-volatile storage, e.g., Flash device.

That is, upon detection of a milestone or threshold level of any of the dimensions or integrity factors being met or surpassed, by firmware or software corresponding to a controller of a non-volatile storage, a media scan of one or more blocks or super-blocks of data stored in the non-volatile storage may be independently initiated or activated. Thus, detection of a milestone or threshold level of the respective dimensions or integrity factors being met or exceeded may be regarded as an independent trigger, stimulus, or catalyst for one or more media scans for the corresponding non-volatile storage.

Non-limiting examples of dimensions or integrity factors, at which milestone or threshold levels thereof have the potential to effect the integrity of data stored in an SSD include the following:

Data retention: Data retention refers to a length of time that data has been written to the media as monitored and/or recorded by a firmware timer. In accordance with non-limiting example embodiments described and recited herein, when the monitored and/or recorded amount of time that data has been written to a block or super-block of a non-volatile storage, e.g., NAND Flash device, meets or exceeds one or more milestone or threshold values and the RBER meets or exceeds a threshold value of its own, a media scan may be activated or initiated.

In accordance with the non-limiting embodiments described and recited herein, as RBER increases due to charge loss on, e.g., NAND flash storage cells, a super-block-based timer tracks data retention time of data therein.

Read Disturb: Read disturb refers to a read count for each block or super-block of data stored in a non-volatile storage device, e.g., NAND Flash storage device. In accordance with non-limiting example embodiments described and recited herein, a read counter monitors and/or records the pass-through voltage for blocks or super-blocks of stored media, when a high voltage, i.e., pass-through voltage, is applied to word-lines other than the word-line being read. When the read count reaches or surpasses one or more milestone or threshold values and the RBER meets or exceeds a threshold value of its own, a media scan may be activated or initiated.

In accordance with the non-limiting embodiments described and recited herein, a super-block-based read counter tracks the impact of a high voltage, i.e., pass-through voltage, being applied during an, e.g., NAND Flash read operation, other word-lines other than a reading word-line, and thus impacting voltage distribution of other word-lines, which increases RBER.

Program Disturb: Program disturb refers to open word-lines, the erasure of word-lines, and/or the suspension of a program in a block or super-block of non-volatile storage, e.g., NAND device. In accordance with non-limiting example embodiments described and recited herein, a firmware component provides a predictive corruption level for each super-block determined on factors including, but not limited to, length of time for programming, number of program suspensions while programming, etc. When the amount of time of such detection reaches one or more milestone or threshold values and the RBER meets or exceeds a threshold value of its own, a media scan may be activated or initiated.

In accordance with the non-limiting embodiments described and recited herein, during operation of an, e.g., NAND Flash program, open word-lines in the process of being erased could be inflicted with retention, read-disturb, and WL-WL coupling noises that introduce adverse voltage distribution. Frequent program suspension also result in diminished program quality, leading to RBER increasing.

RBER: RBER (raw bit error rate) refers to bit error rate prior to correction. In accordance with non-limiting example embodiments described and recited herein, an error counter monitors and/or records, during host I/O and flash translation layer (FTL) operations, the RBER in each block or super-block of stored data. When the RBER count meets or exceeds one or more milestone or threshold levels, a media scan may be activated or initiated.

In accordance with the non-limiting embodiments described and recited herein, RBER count is initiated by firmware.

The non-limiting example embodiments described and recited herein provide, facilitate, and/or implement a weighted scheme to coordinate media scans triggered based on an aggregation of the weighted dimensions for a plurality of blocks or super-blocks of a non-volatile storage, e.g., NAND device. Thus, bandwidth for a respective device may be efficiently preserved and/or allocated by preventing multiple simultaneous or successive media scans that are based on threshold values of the respective dimensions or integrity factors being met or exceeded.

The non-limiting example embodiments described and recited herein may also take into consideration one or more coeffects, i.e., secondary effects, that may affect the weight provided or assigned to one or more of the dimensions or integrity factors. As non-limiting examples, one or more of data retention, read disturb, program disturb, and RBER monitoring and/or recording may be affected by coeffects including, but not limited to, open word-lines and/or weak word-lines.

Open word-lines may cause the RBER to meet or exceed a threshold level thereof, particularly when noise is applied, when non-volatile storage, e.g., NAND Flash memory, is in an intermediate state, i.e., has one or more open word-lines when an, e.g., NAND Flash block is not fully programmed.

Weak word-lines may be word-lines, e.g., in an NAND array, that contain stuck cells or that cause faster charge loss, as monitored by device firmware or software. Blocks or super-blocks in which weak word-lines are disposed may still be used in the storage device, but the performance of the weak word-lines may cause the RBER to meet or exceed a milestone or threshold level thereof.

Media scan intervals may be affected by increasing temperatures during operation or functioning of the device. That is, as the device operates and the temperature thereof increases, RBER is likely to increase, which increases a frequency for media scans.

As non-limiting examples, within normal operation temperatures, i.e., 0 to 70° C., an RBER count should be above the lower threshold thereof, in view of the read-disturb count, data retention, and program disturb count.

Media scan intervals may also be affected by drive lifetime, or program erase count (PEC). That is, a non-volatile storage, e.g., NAND flash memory, has a limited program erase cycle count and, therefore, each block program/erase cycle causes wear to the media, thus increasing channel noise and the frequency for media scans.

Media scan intervals may further be affected by one or more exceptions including, e.g., a power loss event or long-term power off state, which both may increase the frequency for media scans.

Figure 1:
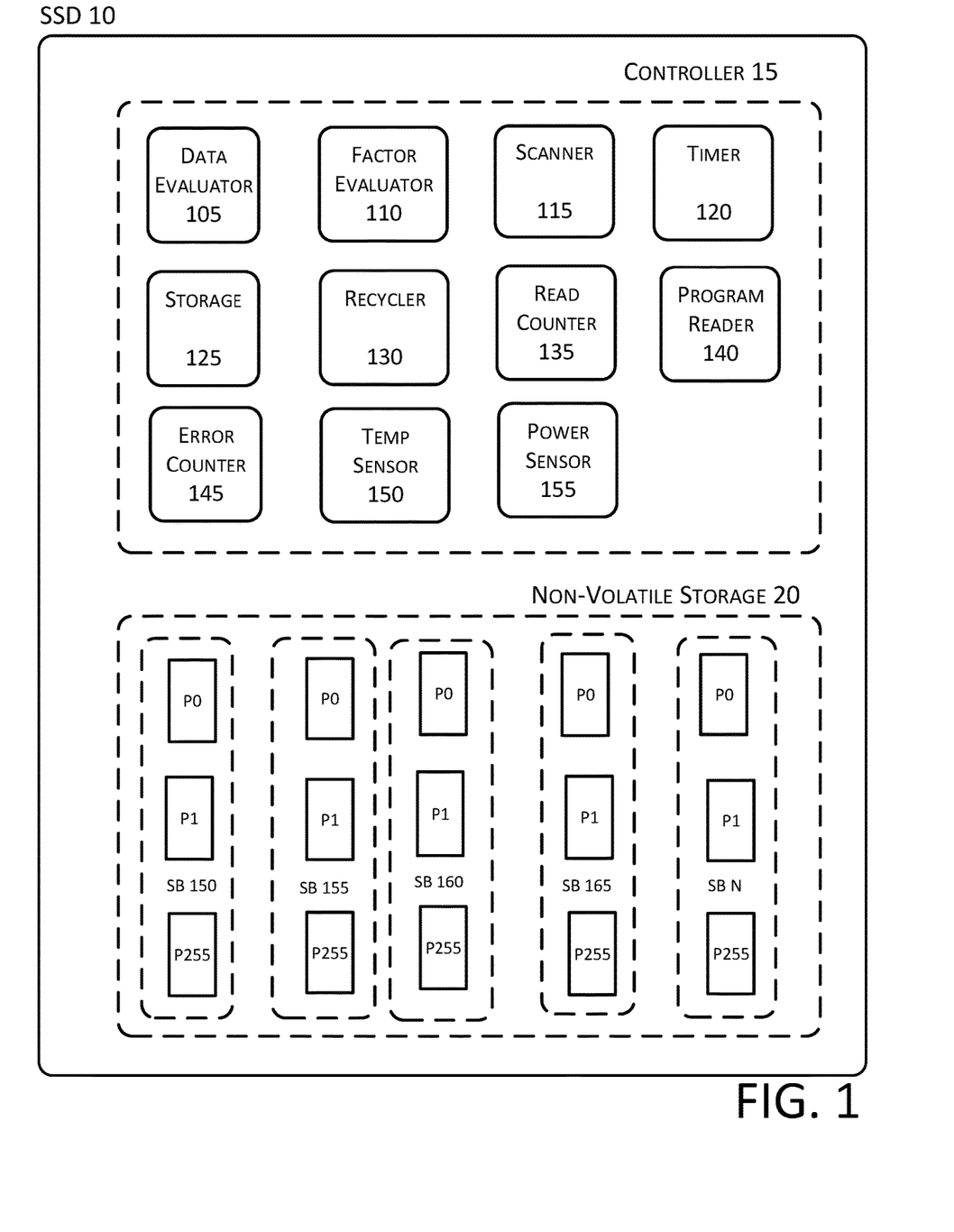
FIG. 1 shows a non-limiting example of a solid state storage device, arranged in accordance with at least some embodiments described and recited herein.

FIG. 1 shows a non-limiting example of a solid-state storage device (SSD), arranged in accordance with at least some embodiments described and recited herein.

SSD 10 may be implemented, arranged in accordance with at least some embodiments described and recited herein. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

As depicted, SSD 10 is implemented as a non-volatile storage device, which may include but not be limited to a NAND Flash device. Device 10 includes controller 15 and non-volatile storage, e.g., Flash memory, 20. Controller 10 may include data evaluator 105, factor evaluator 110, scanner 115, timer 120, storage 125, recycler 130, read counter 135, program reader 140, error counter 145, temperature sensor 150, and power sensor 155.

Controller 15 refers to hardware, firmware, and/or software disposed within or otherwise corresponding to SSD 10 that is designed, programmed, or otherwise configured to manage data stored in non-volatile storage 20 and to communicate with a host processing device.

Data evaluator 105 refers to a firmware or software component that is designed, programmed, or otherwise configured to evaluate a state of each of multiple blocks of data stored in non-volatile storage 20.

Factor evaluator 110 refers to a firmware or software component that is designed, programmed, or otherwise configured to provide or assign a weight to each of the dimensions or multiple integrity factors for each of the multiple blocks or super-blocks of data for which at least one milestone or threshold value has been reached or surpassed, aggregate the weighted dimensions or integrity factors for each of the blocks or super-blocks of data, and identify one of the blocks or super-blocks of data stored in non-volatile storage 20 for which the aggregated weights is highest. Factor evaluator 110 also evaluates the weight for each of the multiple dimensions or integrity factors for each of the blocks or super-blocks of data in accordance with corresponding open word-lines and word-lines that are to be released.

Factor evaluator 110 accesses a table stored in, e.g., storage 125 that lists milestones and/or threshold levels and corresponding weights that may be provided or assigned to the aforementioned dimensions or integrity factors.

As a non-limiting example or implementation, the weights may be representative of statistical probabilities of data corruption corresponding to the respective dimension/integrity factor. More particularly, the weights represent a risk of RBER (raw bit error rate), which is determined prior to correction, reaching a refresh threshold for the respective dimension or integrity factor. Thus, applying the Pareto principle, which states that, for many outcomes, roughly 80% of consequences come from 20% of causes (the "vital few"), weights for dimensions or integrity factors may be determined and assigned or provided, and increasing weights may be applied after predetermined milestones or threshold values of the dimensions or integrity factors, e.g., 0.5, 0.8. The values may vary so long as they are uniformly applied for each of the dimensions or integrity factors. Non-limiting example values of the weights provided or assigned for respective dimensions or threshold values are listed below:

Data Retention:

As non-limiting examples of the weights provided or assigned, after reaching 80% of the maximum retention time for the blocks or super-blocks of data stored in non-volatile storage 20, 0.2 weight is applied.

| Time | Weight |
| --- | --- |
| 24 hours | 0.2 |
| 72 hours | 0.5 |
| One week | 0.8 |

Read Disturb

After reaching 80% of the maximum read counter for a particular PEC range for blocks or super-blocks of data stored in non-volatile storage 20, 0.2 weight is applied.

| Read Count | Weight |
| --- | --- |
| 100K | 0.2 |
| 500k | 0.5 |
| 1M | 0.8 |

Program Disturb

After reaching 80% of the maximum open time for one or more word-lines for blocks or super-blocks of data stored in non-volatile storage 20, 0.2 weight is applied.

| Time that Block is Open or Suspended | Weight |
| --- | --- |
| 1 hour | 0.2 |
| 6 hours | 0.5 |
| 12 hours | 0.8 |

RBER

After reaching 80% of the allowable RBER for blocks or super-blocks of data stored in non-volatile storage 20, 0.2 weight is applied.

A lower boundary of an RBER threshold may serve as a point at which a weight is assigned, though not yet triggering a media refreshed. The lower boundary may be based on an, e.g., error correction code (ECC) engine performance. The lower boundary does not trigger high latency decoding, e.g., read re-try or high LDPC iteration during decoding.

Conversely, when a higher boundary of an RBER threshold is met, a media refresh may be automatically triggered.

| Time that Block is Open or Suspended | Weight |
| --- | --- |
| 0.002 | 0.2 |
| 0.003 | 0.5 |
| 0.005 | 0.8 |

The values listed on the left of the listings of weights are milestones or threshold values of respective dimensions or integrity factors, and the values listed on the right of the listings are weights to be assigned to the corresponding dimension or integrity factor that at least meets the respective milestones or threshold values. Further, for all of the dimensions or integrity factors listed above, when a maximum value of a milestone or threshold value is reached, the weight assigned thereto is 1.

Thus, as data evaluator 105 informs factor evaluator 110 of a state of each of block or super-block of data on non-volatile storage 20, e.g., SB 150, SB 155, SB 160, SB 165, and SB 170, factor evaluator 110 provides or assigns a corresponding weight for each of the dimensions or integrity factors based on the milestones or threshold values reached or exceeded for each of the blocks or super-blocks.

If a respective one of the blocks or super-blocks has yet to reach a milestone or threshold value for a respective dimension or integrity factor, factor evaluator 110 has no weight to provide or assign thereto. Further, for the non-limiting example embodiments depicted and described herein, the three dimensions or integrity factors having the highest weights are aggregated for each block or super-block, as discussed below. However, such example embodiments are not limiting. Any number of dimensions or integrity factors may be weighted and aggregated, so long as the number of dimensions or integrity factors and the scale of assigned weights are the same for each block or super-block.

In accordance with at least some alternative example embodiments of weighted non-volatile storage media scans, the operations or functions performed by data evaluator 105 and factor evaluator 110 may be performed or executed by a combined firmware or software component.

Regardless, after factor evaluator 110 provides or assigns a corresponding weight for each of the dimensions or integrity factors based on the milestones or threshold values being reached or exceeded for each of the blocks or super-blocks, factor evaluator 110 further aggregates the weights for each of the blocks or super-blocks, and prioritizes the blocks or super-blocks for a media scan based on the respective aggregation of weights. The block(s) or super-block(s) of data identified as having the highest aggregation of weights has the highest priority.

Scanner 115 refers to a firmware or software component that is designed, programmed, or otherwise configured to initiate or activate at least one media scan of the block(s) or super-block(s) of data stored in non-volatile storage 20, e.g., NAND flash memory, in the order prioritized by factor evaluator 110. Scanner 115 is to activate or initiate media scans of the blocks or super-blocks of data stored in non-volatile storage 20 in a descending order of weighted factors aggregated by factor evaluator 110. That is, scanner 115 activates or initiates media scans on a basis of priority, starting with blocks or super-blocks of data having the highest priority, i.e., highest likelihood of data corruption. Further still, scanner 115 may regulate or adjust a frequency of one or more media scans of one or more blocks or super-blocks of stored data based on a temperature reading provided by temperature sensor 150.

In accordance with the non-limiting example embodiments described and recited herein, scanner 115 initiates or activates one or more programs or techniques for scanning blocks or super-blocks of data to identify corrupted blocks or super-blocks. The scanning includes detection and, in accordance with at least some non-limiting example embodiments, activation or initiation of one or more error correction algorithms to repair or remedy media errors before such errors are discovered during a normal from—from or write—to the respective blocks or super-blocks. Low Density Parity Code (LDPC) is a non-limiting example of an error correction algorithm that may be deployed by scanner 115.

Detected errors may be written to storage 125 or an event log corresponding to controller 15.

Timer 120 refers to a firmware or software component that is designed, programmed, or otherwise configured to monitor and/or record an amount of time data is stored in each of the multiple blocks of data. According to at least one non-limiting example embodiment, the monitored and/or recorded time is utilized by either of data evaluator 105 or factor evaluator 110 to determine weights for the dimensions or integrity factors of data retention, program disturb, and RBER.

Storage 125 refers to a firmware or software component that is designed, programmed, or otherwise configured to store at least one readable table that includes weight values corresponding to milestones or threshold values of dimensions or integrity factors to which at least one of data evaluator 105 or factor evaluator 110 refers. Storage 125 may be further designed, programmed, or otherwise configured to store an event log of errors found in a respective block or super-block of data, discovered during a media scan thereof.

Further, storage 125 refers to a non-volatile storage component that stores therein program data that includes executable instructions to implement any of the functions or operations described and/or recited herein; and, therefore, storage 125 may be regarded as a computer-readable medium.

Recycler 130 refers to a firmware or software component that is designed, programmed, or otherwise configured to recycle the data stored within respective ones of the blocks of data stored in non-volatile storage 20, e.g., NAND flash memory, when the media scan reveals corrupted data therein. According to at least one non-limiting example embodiment, recycler 130 may operate or function in coordination with scanner 115 to repair or remedy errors found in a block or super-block of data, as the media is being scanned.

Read counter 135 refers to a firmware or software component that is designed, programmed, or otherwise configured to count a number of times that data is read from each of the blocks or super-blocks of data stored in non-volatile storage 20. According to at least one non-limiting example embodiment, the monitored and/or recorded count is utilized by either of data evaluator 105 or factor evaluator 110 to provide or assign weights for the dimension or integrity factor of read disturb.

Program reader 140 refers to a firmware or software component that is designed, programmed, or otherwise configured to determine whether a respective one of the blocks or super-blocks of stored data has an open word-line or a word-line is being erased.

Error counter 145 refers to a firmware or software component that is designed, programmed, or otherwise configured to monitor and/or record a bit error rate (BER) for each of the blocks or super-blocks of stored data.

Temperature sensor 150 refers to a firmware or software component that is designed, programmed, or otherwise configured to monitor and/or record a temperature within portions of or the entirety of non-volatile storage 20.

Power sensor 155 refers to a firmware or software component that is designed, programmed, or otherwise configured to monitor and/or record whether non-volatile storage 20 has had a power loss event and/or whether a length of time that non-volatile storage 20 had been without power after each of the blocks or super-blocks of data in non-volatile storage 20 is populated.

Non-volatile storage 20 refers to memory, e.g., NAND Flash memory, having multiple blocks or super-blocks SB150, SB155, SB155, SB160, SB165, . . . SBN; each of which has pages P0, P1 . . . P255. The quantity of blocks or super-blocks SB150-SBN is not limited by the depiction thereof, and each may include pages P0-P255 inclusive.

Non-volatile storage 20 may be implemented as a NAND Flash memory. Accordingly, SSD 10 may be implemented as a USB flash drive, memory card, or other solid-state drive (SSD), for use in computers, mobile phones, video game consoles, robotics, etc.

Figure 2:
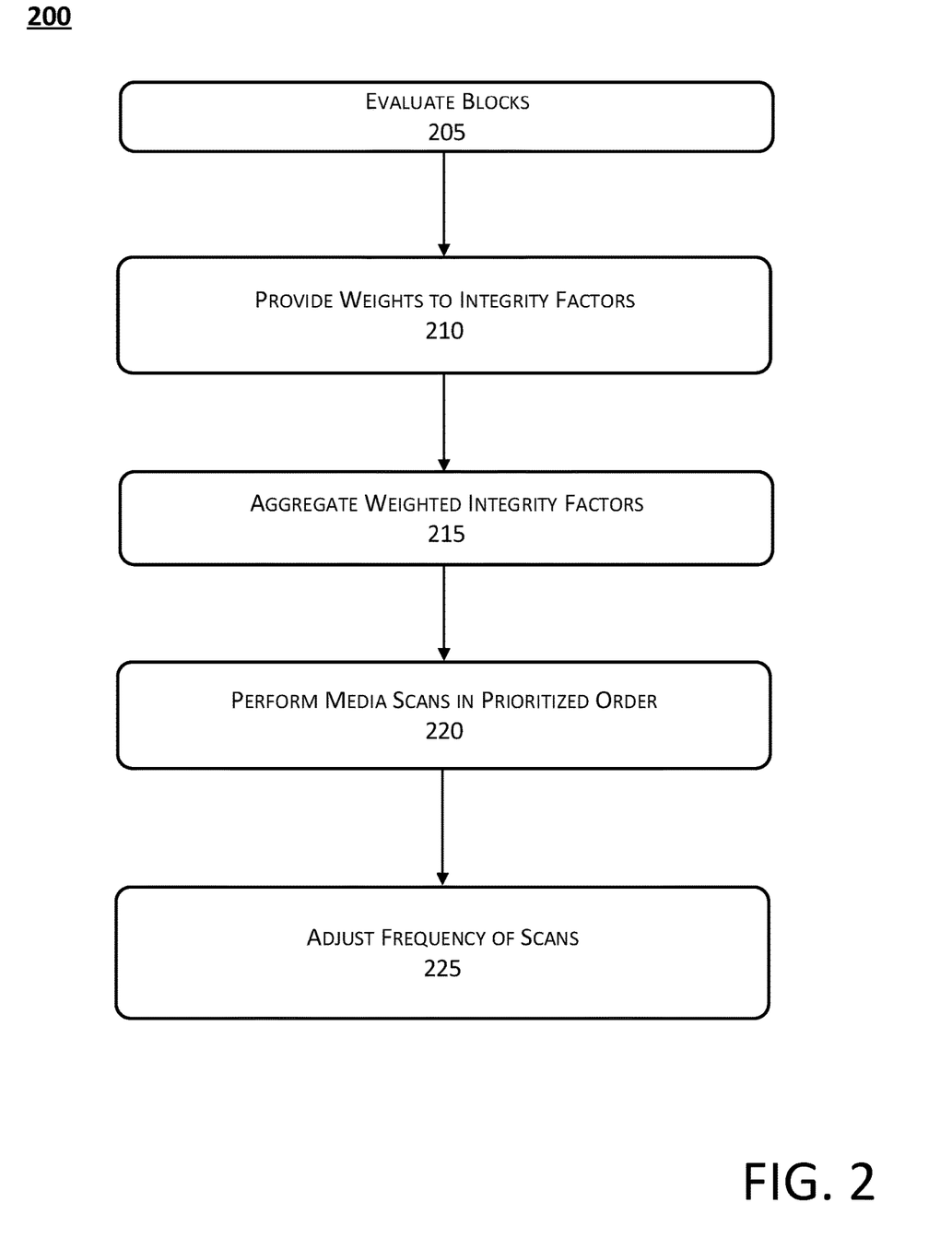
FIG. 2 shows a non-limiting example processing flow for weighted non-volatile storage media scans, in accordance with at least some embodiments described and recited herein.

FIG. 2 shows non-limiting example processing flow 200 for weighted non-volatile storage media scans, in accordance with at least some embodiments described and recited herein.

As depicted, processing flow 200 includes operations, actions, or functions, as illustrated by representative blocks 205, 210, 215, 220, and 225. These various operations, functions, or actions may correspond to, e.g., software, programmed code, or programmed instructions executable by firmware that causes the functions to be performed. Although illustrated as discrete blocks, obvious modifications may be made, e.g., two or more of the blocks may be re-ordered; further, one or more blocks may be added; and various blocks may be divided into additional blocks, combined into fewer blocks, or even eliminated, depending on the desired implementation. Processing flow 200 may begin at block 205.

Block 205 (Evaluate Blocks) refers to data evaluator 105 evaluating a state of each of blocks or super-blocks SB150, SB155, SB155, SB160, SB165, . . . SBN stored in non-volatile storage 20, and informing factor evaluator 110 of the evaluated state of each block or super-block.

As set forth above, in accordance with at least some alternative example embodiments of weighted non-volatile storage media scans, the operations or functions performed by data evaluator 105 and factor evaluator 110 may be performed or executed by a combined firmware or software component. Processing may proceed from block 205 to block 210.

Block 210 (Provide Weights to Integrity Factors) refers to factor evaluator 110 providing a weight to each of the multiple dimensions or integrity factors for each of the blocks or super-blocks of data when at least one milestone or threshold value has been reached for a respective dimension or integrity factor, as informed by data evaluator 105. The providing or assigning of weights to respective dimensions or integrity factors is based on, e.g., a table of such dimensions/integrity factors and weights corresponding to milestones or threshold values thereof that is stored in storage 125 or another storage corresponding to controller 15. Processing may proceed from block 210 to block 215.

Block 215 (Aggregate Weighted Integrity Factors) refers to at least factor evaluator 110 aggregating the weighted dimensions or integrity factors for each of the blocks or super-blocks of data having at least one weighted dimension or integrity factor, and identifying one of the blocks or super-blocks of data stored in non-volatile storage 20 for which the aggregated weights is highest. Processing may proceed from block 215 to block 220.

Block 220 (Perform Media Scans in Prioritized Order) refers to scanner 115 initiating or activating at least one media scan of the blocks or super-blocks of data stored in non-volatile storage 20, e.g., NAND Flash memory, in a descending order of weighted factors aggregated by factor evaluator 110. Thus, media scans are initiated or activated in a prioritized order, starting with blocks or super-blocks of data having the highest priority, i.e., highest likelihood of data corruption. Processing may proceed from block 220 to block 225.

Block 225 (Adjust Frequency of Scans) refers to scanner 115 increasing a frequency of the media scans, in the prioritized order, if or when the likelihood of data corruption increases.

For the non-limiting example embodiments of weighted non-volatile storage media scans described and recited herein, scan intervals are impacted by working temperature, PEC, etc. That is, a frequency of one or more media scans of one or more blocks or super-blocks of stored data may be regulated or adjusted based on a temperature reading provided by temperature sensor 150, e.g., 80% of a highest allowable working temperature of non-volatile storage 20. Thus, as temperature sensor 150 detects temperatures in or around non-volatile storage 20 reaching or exceeding that threshold temperature, scanner 115 increases a frequency of the media scans.

Also, as read counter 135 determines that respective ones of blocks or super-blocks SB150, SB155, SB155, SB160, SB165, . . . SBN approaches, meets, or surpasses its drive lifetime, scanner 115 increases the frequency of media scans. That is, non-volatile storage 20, e.g., NAND Flash memory, has a limited program erase count (PEC), and thus each block or super-block of data wears out, increasing noise channel. For example, up to 80% of the PEC of non-volatile storage 20 is regarded as early-life of the memory, and beyond 80% of the PEC is regarded as end-of-life of the memory. Thus, when the end-of-life threshold is met or is exceeded, scan frequency is increased as the likelihood of data corruption increases.

Further still, when power sensor 155 determines that non-volatile storage 20 has had a power loss event and/or that a length of time that non-volatile storage 20 had been without power for an amount of time that meets or exceeds an acceptable threshold value, after each of the blocks or super-blocks of non-volatile storage 20 is populated with data, scanner 115 is to increase a frequency of the media scans as the likelihood of data corruption increases.

In accordance with the non-limiting example embodiments of processing flow 200, scanner 115 initiates or activates one or more programs or techniques for scanning blocks or super-blocks of data to identify corrupted blocks or super-blocks of data. The scanning detects and, in accordance with at least some non-limiting example embodiments, activates or initiates correction of media errors before such errors are discovered during a normal from—from or write—to the respective blocks or super-blocks. Detected errors may be written to storage 125 or an event log corresponding to controller 15.

Figure 3:
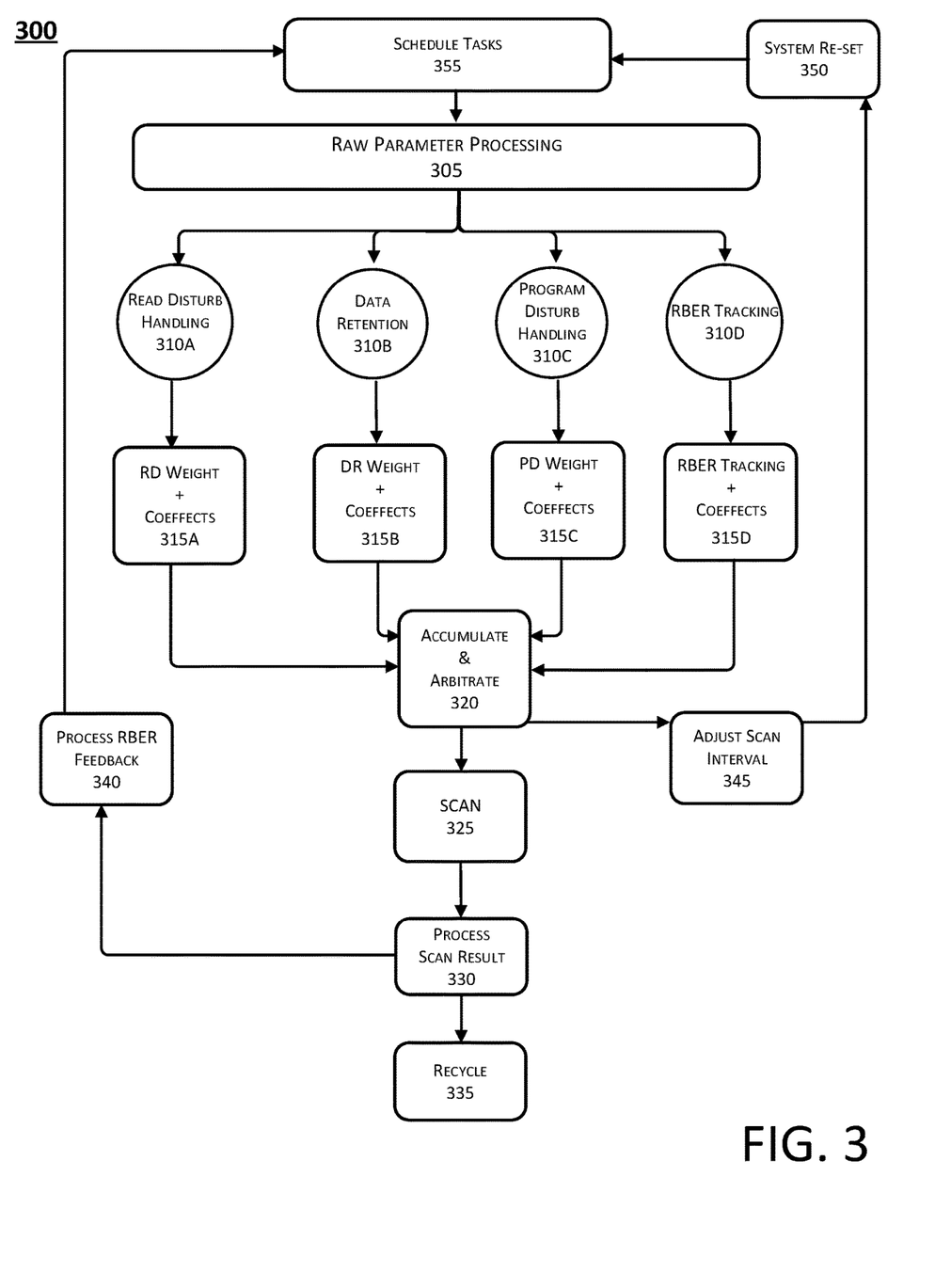
FIG. 3 shows a further example of the processing flow for weighted non-volatile storage media scans, in accordance with at least some embodiments described and recited herein.

FIG. 3 shows a processing flow 300 for weighted non-volatile storage media scans, further to processing flow 200, in accordance with at least some embodiments described and recited herein.

As depicted, processing flow may be complimentary to processing flow 200. In addition, or in the alternative, processing flow 300 includes a different implementation of operations, actions, or functions, as illustrated by at least some of representative blocks 305, 315, 320, 325, 330, 335, 340, 345, 350, and 355. These various operations, functions, or actions may correspond to, e.g., software, programmed code, or programmed instructions executable by firmware that causes the functions to be performed. Although illustrated as discrete blocks, obvious modifications may be made, e.g., two or more of the blocks may be re-ordered; further, one or more blocks may be added; and various blocks may be divided into additional blocks, combined into fewer blocks, or even eliminated, depending on the desired implementation. Processing flow 300 may begin at block 305.

Block 305 (Raw Parameter Processing) refers to evaluator 105 evaluating a state of each of blocks or super-blocks SB150, SB155, SB155, SB160, SB165, . . . SBN stored in non-volatile storage 20, and informing factor evaluator 110 of the parameters of each dimension or integrity factor for each block or super-block of data stored in non-volatile storage device, e.g., NAND Flash storage device, 20.

The parameters of the respective dimensions or integrity factors may be recorded or stored in storage 125 as, e.g., storage components 310A-310D.

Storage component 310A (Read Disturb Handling) refers to storage of a read count for each block or super-block of data stored in non-volatile storage device, e.g., NAND Flash storage device, 20.

Storage component 310B (Data Retention) refers to storage of the monitored and/or recorded amount of time that data has been written to a block or super-block of non-volatile storage, e.g., NAND Flash device, 20.

Storage component 310C (Program Disturb Handling) refers to storage of a predictive corruption level for each block or super-block determined on factors including, but not limited to, length of time for programming, number of program suspensions while programming, etc.

Storage component 310D (RBER Tracking) refers to storage of an RBER count for each block or super-block of data stored in non-volatile storage device, e.g., NAND Flash storage device, 20.

Processing may proceed concurrently to blocks 315A-315D.

Block 315A (RD Weight+Coeffects) refers to the stored read count 310A for each block or super-block of stored data being weighted by factor evaluator 110 in accordance with, e.g., the non-limiting example weights described above.

Block 315B (DR Weight+Coeffects) refers to the stored data retention times 310B for each block or super-block of stored data being weighted by factor evaluator 110 in accordance with, e.g., the non-limiting example weights described above.

Block 315C (PD Weight+Coeffects) refers to the stored predictive corruption levels 310C for each block or super-block of stored data being weighted by factor evaluator 110 in accordance with, e.g., the non-limiting example weights described above.

Block 315D (RBER Tracking+Coeffects) refers to the stored RBER 310D for each block or super-block of stored data being weighted by factor evaluator 110 in accordance with, e.g., the non-limiting example weights described above.

Processing may proceed to block 320.

Block 320 (Accumulate & Arbitrate) refers to at least factor evaluator 110 aggregating and/or normalizing the weighted dimensions or integrity factors for each of the blocks or super-blocks of data having at least one weighted dimension or integrity factor, and identifying one of the blocks or super-blocks of data stored in non-volatile storage 20 for which the aggregated weights is highest. Processing may proceed to block 325, as well as to block 345.

Block 325 (Scan) refers to scanner 115 initiating or activating at least one media scan of the blocks or super-blocks of data stored in non-volatile storage 20, e.g., NAND Flash memory, in a descending order of weighted factors aggregated by factor evaluator 110. Thus, media scans are initiated or activated in a prioritized order, starting with blocks or super-blocks of data having the highest priority, i.e., highest likelihood of data corruption. Processing may proceed to block 330.

Block 330 (Process Scan Results) refers to scanner 115 receiving results of the scan on the blocks or super-blocks of data stored in non-volatile storage 20, e.g., NAND Flash memory.

Block 335 (Recycle) refers to recycler 130 recycling the data stored within respective ones of the blocks or super-blocks of data stored in non-volatile storage 20, e.g., NAND flash memory, when the media scan reveals corrupted data therein. According to at least one non-limiting example embodiment, recycler 130 may operate or function in coordination with scanner 115 to repair or remedy errors found in a block or super-block of data, as the media is being scanned. Processing may proceed to block 340.

Block 340 (Process RBER Feedback) refers to error counter 145 sending the RBER count for each of the blocks or super-blocks of data stored in non-volatile storage 20, e.g., NAND Flash memory, to data evaluator 105 for a subsequent cycle of processing. Processing may proceed to block 355.

Block 345 (Adjust Scan Interval) refers to scanner 115 increasing a frequency of the media scans, in the prioritized order, if or when the likelihood of data corruption increases, based on any one of several factors including, but not limited to, working temperature, PEC, drive lifetime, power loss events, etc.

Block 350 (System Re-set) refers to data evaluator 105 utilizing the adjusted scan interval schedule to determine a next iteration of processing flows 200 and/or 300.

Block 355 (Schedule Tasks) refers to an initiation of processing flows 200 and/or 300.

The processes and of weighted media scans for non-volatile storage may be implemented as executable instructions stored on a non-volatile computer-readable medium, including firmware corresponding to device 10. The computer-readable instructions may, for example, be executed by firmware of device 10.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Aspects

Aspect 1. A non-volatile storage device, comprising:
a non-volatile storage; and
a controller, comprising:
  a data evaluator to evaluate each of multiple blocks of data stored in the non-volatile storage in accordance with multiple integrity factors,
  a factor evaluator to:
    provide a weight to each of the multiple integrity factors for each of the multiple blocks of data,
    aggregate the multiple weighted integrity factors for each of the multiple blocks of data, and
    identify one of the multiple blocks of data stored in the non-volatile storage for which the aggregated weight integrity factors is highest, and
  a scanner to perform at least one media scan of the identified block of data stored in the non-volatile storage.

Aspect 2. The non-volatile storage device of Aspect 1, wherein the scanner is to perform at least one media scan of the remainder of the multiple blocks of data stored in the non-volatile storage in descending order of aggregated weights.

Aspect 3. The non-volatile storage device of either of Aspects 1 or 2, wherein the controller further comprises:
a storage to store at least one table that includes weights for each of the multiple integrity factors.

Aspect 4. The non-volatile storage device of any of Aspects 1-3, wherein the controller further comprises:
a recycler to recycle the data stored within respective ones of the blocks of data stored in the non-volatile storage when the media scan reveals corrupted data therein.

Aspect 5. The non-volatile storage device of any of Aspects 1-4, wherein the controller further comprises:
a timer to monitor and/or record an amount of time that data is stored in each of the multiple blocks of data,
a read counter to count a number of times data is read from each of the multiple blocks of data,
a program reader to determine whether a respective one of the multiple blocks of data has an open word-line or a word-line is being erased, and
an error counter to monitor and/or record a bit error rate (BER) for each of the multiple blocks of data.

Aspect 6. The non-volatile storage device of any of Aspects 1-5, wherein the multiple integrity factors include time of data retention, read count, program suspensions, and bit error rate (BER) for each of the multiple blocks of data stored in the non-volatile storage.

Aspect 7. The non-volatile storage device of any of Aspects 1-6, wherein the factor evaluator is to further:
evaluate the weight for each of the multiple integrity factors for each of the multiple blocks of data in accordance with open word-lines and word-lines that are to be released, therein.

Aspect 8. The non-volatile storage device of any of Aspects 1-7, wherein the controller further comprises:
a temperature sensor to determine a temperature within the non-volatile storage,
wherein the scanner is to further adjust a frequency of the at least one media scan of the blocks of data stored in the non-volatile storage based on the determined temperature therein.

Aspect 9. The non-volatile storage device of any of Aspects 1-8, wherein the scanner is to further adjust a frequency of the media scan of a respective one of the blocks of data based on the number of times data is read therefrom.

Aspect 10. The non-volatile storage device of any of Aspects 1-9, wherein the controller further comprises:
a power sensor to determine:
whether the non-volatile storage has had a power loss event, and
a length of time that the non-volatile storage had been without power after each of the multiple blocks of the non-volatile storage is populated with the data stored therein, and
the scanner is to increase a frequency of the at least one media scan of a respective one of the blocks of data when the power sensor determines that the non-volatile storage has had a power loss event or the determined length of time that the non-volatile storage had been without power exceeds a threshold amount of time.

Aspect 11. The non-voltage storage device of any of Aspects 1-10, wherein the non-volatile storage is a NAND flash memory.

Aspect 12. The non-volatile storage device of any of Aspects 1-11, wherein the non-volatile storage device is a NAND Flash drive.

Aspect 13. A method to preserve operating bandwidth for a non-volatile storage device, the method comprising:
evaluating each of multiple blocks of data stored in the non-volatile storage in accordance with multiple integrity factors;
providing a weight to each of the multiple integrity factors for each of the multiple blocks of data;
aggregating the multiple weighted integrity factors for each of the multiple blocks of data;
performing a media scan for the one of the multiple blocks of data stored in the non-volatile storage for which the aggregated weight integrity factors is highest; and
performing a media scan for the remainder of the multiple blocks of data stored in the non-volatile storage.

Aspect 14. The method of Aspect 13, wherein the multiple integrity factors include time of data retention, read count, program suspensions, and bit error rate (BER) for each of the multiple blocks of data stored in the non-volatile storage.

Aspect 15. The method of either of Aspects 13 or 14,
wherein data retention pertains to an amount of time data is stored in a respective one of the multiple blocks of data,
wherein read count pertains to a number of times that data is read from a respective one of the multiple blocks of data,
wherein program suspensions pertains to whether a respective one of the multiple blocks of data has an open word-line or a word-line is being erased, and
wherein BER pertains to a counted number of bit errors for each of the multiple blocks of data.

Aspect 16. The method of any of Aspects 13-15, wherein the weights are provided in accordance with threshold values for each of the integrity factors.

Aspect 17. The method of any of Aspects 13-16, wherein the weights for a respective one of the data blocks are affected by whether a respective one of the multiple blocks of data has an open word-line or a word-line is being erased.

Aspect 18. The method of any of Aspects 13-17, wherein a frequency of the performed media scans is affected by a temperature within the non-volatile storage.

Aspect 19. The method of any of Aspects 13-18, wherein a frequency of the performed media scans for a respective one of the data blocks is affected by a number of times data is read therefrom.

Aspect 20. The method of any of Aspects 13-19, wherein the performing of a media scan for the remainder of the multiple blocks of data stored in the non-volatile storage is executed in descending order of the aggregated weights.

The invention claimed is:
1. A non-volatile storage device, comprising:
a non-volatile storage; and
a controller, comprising:
a data evaluator configured to evaluate each of multiple blocks of data stored in the non-volatile storage in accordance with multiple integrity factors,
a factor evaluator configured to:
provide a weight to each of the multiple integrity factors for each of the multiple blocks of data,
aggregate the multiple weighted integrity factors for each of the multiple blocks of data, and
identify a block of data from the multiple blocks of data stored in the non-volatile storage for which the aggregated multiple weighted integrity factors is highest,
a scanner configured to perform at least one media scan of the block of data stored in the non-volatile storage, wherein the media scan comprises reading at least a portion of the data stored in the non-volatile storage, and a power sensor to determine:
whether the non-volatile storage has had a power loss event, and
a length of time that the non-volatile storage had been without power after each of the multiple blocks of the non-volatile storage is populated with the data, wherein the scanner is configured to increase a frequency of the at least one media scan of the block of data when the power sensor determines that the non-volatile storage has had a power loss event or the length of time that the non-volatile storage had been without power exceeds a threshold amount of time.

2. The non-volatile storage device of claim 1, wherein the scanner is to perform at least one media scan of the remainder of the multiple blocks of data stored in the non-volatile storage in descending order of aggregated weights.

3. The non-volatile storage device of claim 1, wherein the controller further comprises:
a storage to store at least one table that includes weights for each of the multiple integrity factors.

4. The non-volatile storage device of claim 1, wherein the controller further comprises:
a recycler configured to recycle the data stored within the block of data stored in the non-volatile storage when the media scan reveals corrupted data within the block of data.

5. The non-volatile storage device of claim 1, wherein the controller further comprises:
a timer to monitor and/or record an amount of time data is stored in each of the multiple blocks of data,
a read counter to count a number of times data is read from each of the multiple blocks of data,
a program reader to determine whether a respective one of the multiple blocks of data has an open word-line or a word-line is being erased, and
an error counter to monitor and/or record a bit error rate (BER) for each of the multiple blocks of data.

6. The non-volatile storage device of claim 1, wherein the multiple integrity factors include time of data retention, read count, program suspensions, and bit error rate (BER) for each of the multiple blocks of data stored in the non-volatile storage.

7. The non-volatile storage device of claim 1, wherein the factor evaluator is to further:
evaluate the weight for each of the multiple integrity factors for each of the multiple blocks of data in accordance with open word-lines and word-lines that are to be released.

8. The non-volatile storage device of claim 1, wherein the controller further comprises:
a temperature sensor configured to determine a temperature within the non-volatile storage,
wherein the scanner is configured to further adjust a frequency of the at least one media scan of the blocks of data stored in the non-volatile storage based on the determined temperature within the non-volatile storage.

9. The non-volatile storage device of claim 1, wherein the scanner is to further adjust a frequency of the media scan of a the block of data based on the number of times data is read therefrom.

10. The non-volatile storage device of claim 1, wherein the non-volatile storage is a NAND Flash memory.

11. The non-volatile storage device of claim 1, wherein the non-volatile storage device is a flash drive.

12. A method to preserve operating bandwidth for a non-volatile storage device, the method comprising:
evaluating each of multiple blocks of data stored in a non-volatile storage in accordance with multiple integrity factors;
providing a weight to each of the multiple integrity factors for each of the multiple blocks of data;
aggregating the multiple weighted integrity factors for each of the multiple blocks of data;
performing a media scan for one of the multiple blocks of data stored in the non-volatile storage for which the aggregated multiple weighted integrity factors is highest, wherein the media scan comprises reading at least a portion of the data stored in the non-volatile storage; and
performing a media scan for a remainder of the multiple blocks of data stored in the non-volatile storage, wherein the media scan for the one of the multiple blocks of data and the media scan for the remainder of the multiple blocks of data is performed at an increased frequency in response to a determination that a length of time that the non-volatile storage has been without power after each of the multiple blocks of data is populated exceeds a threshold amount of time.

13. The method of claim 12, wherein the multiple integrity factors include time of data retention, read count, program suspensions, and bit error rate (BER) for each of the multiple blocks of data stored in the non-volatile storage.

14. The method of claim 13,
wherein data retention pertains to an amount of time data is stored in a respective one of the multiple blocks of data,
wherein read count pertains to a number of times that data is read from a respective one of the multiple blocks of data,
wherein program suspensions pertains to whether a respective one of the multiple blocks of data has an open word-line or a word-line is being erased, and
wherein BER pertains to a counted number of bit errors for each of the multiple blocks of data.

15. The method of claim 13, wherein the weight is provided in accordance with a threshold value for each of the integrity factors.

16. The method of claim 15, wherein the weight for a respective one of the multiple blocks of data are affected by whether a respective one of the multiple blocks of data has an open word-line or a word-line is being erased.

17. The method of claim 12, wherein a frequency of the performed media scan is affected by a temperature within the non-volatile storage.

18. The method of claim 12, wherein a frequency of the performed media scan for a respective one of the multiple blocks of data is affected by a number of times data is read from the respective one of the multiple blocks of data.

19. The method of claim 12, wherein the performing of a media scan for the remainder of the multiple blocks of data stored in the non-volatile storage is executed in descending order of the aggregated weights.

* * * * *